Jan. 11, 1955
F. F. FRICK ET AL
2,699,388
METHOD AND APPARATUS FOR MAKING METALLIC IRON
Filed Oct. 20, 1950
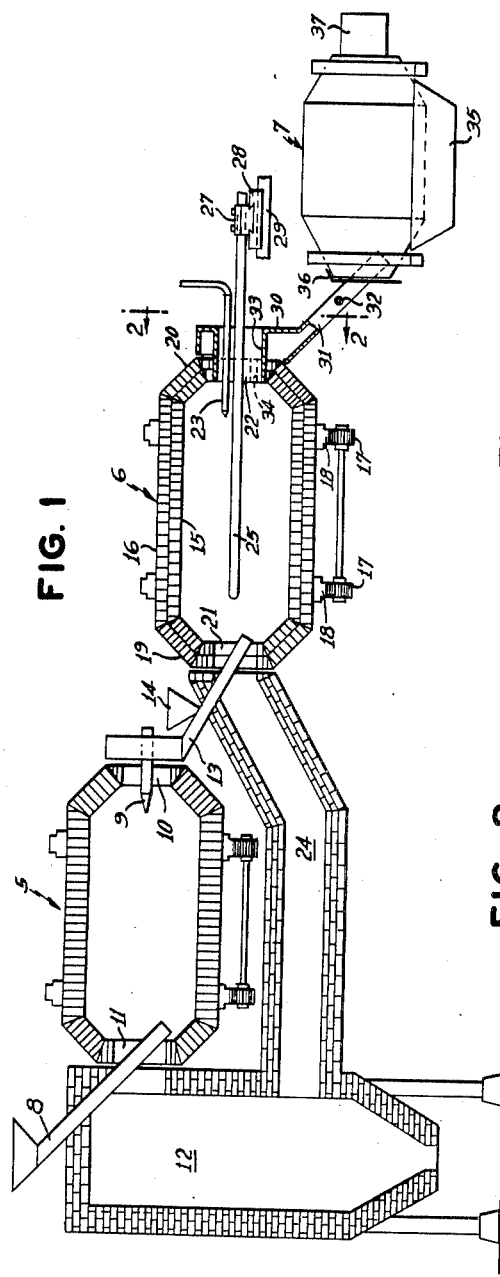
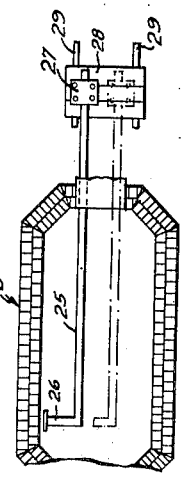
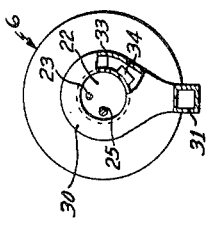
INVENTORS
Frederick F. Frick
Francis Louis Holderreed
BY
Pennie Edmonds Morton Barrows & Taylor
ATTORNEYS

United States Patent Office 2,699,388
Patented Jan. 11, 1955

2,699,388

METHOD AND APPARATUS FOR MAKING METALLIC IRON

Frederick F. Frick and Francis Louis Holderreed, Anaconda, Mont., assignors to Anaconda Copper Mining Company, New York, N. Y., a corporation of Montana Application October 20, 1950, Serial No. 191,302

4 Claims. (Cl. 75—36)

This invention relates to the manufacture of metallic iron for use as a metallurgical precipitant. The principal object of the invention is to provide an improved method of and improved apparatus for the economical production of sponge iron in a form suitable for use in precipitating copper from copper-bearing solutions.

Metallic iron reduced from its ores or other iron-bearing materials at temperatures below the fusion point of iron is generally known as "sponge iron." Many different procedures and types of apparatus have heretofore been proposed for the production of sponge iron. For the most part, special emphasis has been given to the production of sponge iron of a grade suitable for use in open hearth steel furnaces, and much effort has been made to save heat units, with the result that the processes and equipment heretofore developed are too elaborate and complicated for economic commercial operation. Although the use of sponge iron to precipitate copper from copper-bearing solutions has been proposed frequently, the lack of any commercially satisfactory method for making sponge iron has led to the result that scrap iron is generally more readily available and more economical to use for this purpose.

Rotary furnaces in the form of rotary kilns have been proposed frequently for use in making sponge iron. The simplicity of such kilns, and their adaptability to continuous operations, are points strongly favoring their use. However, hot freshly reduced sponge iron is extremely susceptible to oxidation, and on this account it has been found necessary to maintain a completely non-oxidizing atmosphere in kilns used for sponge iron production in order to prevent reoxidation of the thin flow of reduced iron traveling to the furnace outlet. This circumstance has precluded conventional fuel firing, with adequate combustion air, for heating the charge in the kiln to the reduction temperature, and has necessitated turning to more elaborate and costly heating methods that have contributed largely to making the use of rotary kilns for sponge iron production uneconomical.

We have discovered that sponge iron of good quality for use in the precipitation of copper and copper-bearing solutions can be produced readily and economically by the simple procedure of tumbling a deep bed of a mixture composed essentially of iron oxide and solid carbonaceous material while keeping the bed heated to a temperature below the fusion temperature of metallic iron but high enough to effect reduction of the iron oxide to metallic iron by the action of carbonaceous material. We have found that by carrying out this process as a continuous operation, a sponge iron product of excellent quality for use as a copper precipitant can be made on a commercial scale at a cost competitive with scrap iron.

Based on these discoveries, our invention involves making metallic iron in a rotary furnace by establishing therein a deep bed of a charge comprising a mixture of iron oxide and solid carbonaceous material. The bed of charge should extend throughout the interior length of the furnace and its depth along its center line throughout such length should average at least about one quarter of the inside diameter of the furnace. This bed of charge is continuously tumbled over and over on itself by the slow rotation of the furnace, and it is heated by introducing fuel, together with sufficient combustion air for substantially complete combustion of the fuel, directly over the bed and by burning such fuel in such air. The bed of charge is thereby heated to a temperature high enough to effect reduction of the iron oxide to metallic iron by the action of the carbonaceous material in the charge, but below the fusion temperature of metallic iron. Fresh charge is introduced substantially continuously into the heated bed at one end thereof, and reduced charge containing metallic iron is substantially continuously withdrawn from the other end of the bed, the rates of charge introduction and charge withdrawal being substantially equal so that the depth of the bed of charge is continuously maintained.

It is generally most economical to use iron sulfide concentrates recovered as a by-product in the froth flotation concentration of copper sulfide ores as the source of the iron oxide from which the sponge iron is produced in accordance with our invention. Such iron sulfide concentrates are prepared for charging into the rotary furnace by roasting them in an oxidizing atmosphere at a temperature high enough to convert the iron sulfide to iron oxide, and then mixing the solid carbonaceous material with the roasted product. The resulting charge is preferably delivered into the reduction furnace while it is still hot from the roasting operation.

The temperature to which the bed of charge is heated for reduction to the iron oxide is advantageously in the range from 1750° F. to 1900° F. At this temperature the metallic iron which is formed is quite "sticky" and tends to build up accretions on the walls of the furnace. No effort is made to prevent such accretions from forming, but intermittently they are scraped from the furnace walls without interrupting operation of the furnace.

The apparatus in which the method of our invention is carried out comprises a cylindrical rotary furnace having annular (plane or conical) end walls which partially close the furnace at each end. A centrally disposed opening is provided in each of these end walls, the diameter of the opening being substantially smaller than the inside diameter of the furnace (advantageously the diameter of the openings should be from one third to one half the inside diameter of the furnace). Thereby a bed of charge of substantial depth may be established and maintained in the furnace during rotation thereof. The furnace is equipped with means for scraping accretions from its inside surface, comprising a scraper bar having a scraper blade projecting laterally therefrom at one end thereof. The length of the scraper blade is less than the diameter of the opening at one end of the furnace, and the scraper bar is mounted so that it can be moved longitudinally of the kiln to insert the scraper blade through the opening, and so that it can be moved laterally to bring the scraper blade into close proximity to the furnace wall. Then, as the furnace rotates, the scraper bar is moved longitudinally while the furnace rotates to scrape or bore accretions from its interior surface.

The foregoing and other features of the invention are described below with particular reference to the accompanying drawings, in which Fig. 1 is a schematic view, largely in longitudinal section, showing an advantageous arrangement of the apparatus for making sponge iron in accordance with the invention;

Fig. 2 is an end view, partially in section, of the reduction furnace shown in Fig. 1, taken substantially along the line 2—2 of Fig. 1; and Fig. 3 is a horizontal section through the reduction furnace illustrating the operation of the scraper bar.

Basically, the apparatus shown in the drawings comprises a roasting furnace 5, a reduction furnace 6, and a cooler 7. Iron sulfide concentrates are dead-roasted in the roasting furnace 5, and the roasted product, after being mixed with carbonaceous material, is delivered into the reduction furnace 6 wherein it is heated to a sponge iron reduction temperature. The resulting hot reduced sponge iron is passed to the cooler 7 wherein it is cooled in a protective atmosphere to a temperature low enough so that it will not reoxidize to any serious extent upon exposure to air.

Iron sulfide concentrates form a particularly desirable source of iron-bearing feed for the sponge iron process of the invention, for often such concentrates are or can easily be recovered near the site where copper-bearing solutions are to be treated with the sponge iron product.

The grade of sponge iron produced for use as a copper precipitant need not be very high. A product containing as little as 50% metallic iron is generally satisfactory, and such a product can very easily be produced in accordance with the invention from iron sulfide concentrates obtained as a by-product in the recovery of a copper sulfide flotation concentrate.

The iron sulfide concentrates are delivered into the rotary roasting furnace 5 through a feed pipe 8. It is inconsequential, so far as this invention is concerned, whether the concentrates as delivered to the roasting furnace are fresh or have been already partially roasted (as may be the case, for example, if the same concentrates are used as a source of sulfur in the making of sulfuric acid). In the roasting furnace the concentrates are heated under oxidizing conditions for a sufficient period of time and to a high enough temperature to convert their iron content substantially completely to iron oxide.

The roasting furnace 5 is advantageously (though not necessarily) of the rotary type, and is so shown in the drawings. It is lined with fire brick. One or more fuel burners 9 project into the discharge end of the furnace for heating the concentrates to the roasting temperature and to insure the formation of a dead-roasted product. Sufficient air for combustion of the fuel and for oxidation of the sulfur content of the concentrates enters the furnace through an axial opening 10 at its discharge end. The combustion and roaster gases pass out through a similar opening 11 at the charge end of the furnace, into a dust collector 12 lined with fire brick, and thence pass to a flue and stack (not shown).

The dead-roasted product, composed essentially of iron oxides and gangue (mostly silica), passes out of the roasting furnace 5 through the axial opening 10 at its discharge end into a discharge spout 13. As it flows through the spout, a solid carbonaceous material is added to it through a feed funnel 14. The resulting mixture of iron oxide feed and carbonaceous material forms the charge delivered through the spout 13 to the interior of the reduction furnace.

The reduction furnace 6 is a cylindrical rotary furnace lined with fire brick 15 next to the charge and insulating brick 16 next to the supporting shell. It is mounted horizontally (or substantially so) on supporting rollers and is rotated continuously during normal operation by pinions 17 engaging with ring gears 18. The charge and discharge ends of the furnace are partially closed by annular end walls 19 and 20, respectively. Advantageously, as shown in the drawings, these end walls are frusto-conical in shape (though they may if desired be substantially plane). They are formed with centrally disposed openings 21 and 22, respectively. The diameter of these openings should be approximately one third to one half the inside diameter of the cylindrical furnace body. One or more fuel burners 23 project through the opening 22 at the discharge end of the furnace, and the opening 21 at the charge end communicates with a flue 24 leading to the dust chamber 12 for the offtake of combustion gases.

The feed spout 13 extends into the reduction furnace through the central opening 21 at its charge end, and in normal operation a substantially continuous flow of charge enters through this spout. It is characteristic of the process of the invention that a deep bed of charge, extending substantially to the bottoms of the furnace openings 21 and 22, is maintained in the reduction furnace at all times during normal operations. Fuel introduced through the burner 23 is burned in the furnace over the bed of charge in an atmosphere of combustion air which enters through the opening 22; and thereby the bed of charge is heated to and maintained at an elevated temperature below the fusion point of iron but high enough so that the iron oxide constituent of the charge is largely reduced by the action of the admixed carbonaceous material. The reduction does not appear to result from direct action of the carbon on the iron oxide, but rather seems to proceed in accordance with the following typical reactions:

$$FeO + CO \rightarrow CO_2$$

and $$CO_2 + C \rightarrow 2CO$$

The higher oxides of iron are reduced in a similar manner.

The most satisfactory temperature range for the reduction operation is from 1750° to 1900° F. The reactions are endothermic, so that it is necessary for heat to be supplied (by the burning of fuel introduced through the burner 23) in order to maintain the charge at temperatures in this range. At such elevated temperatures metallic iron is easily and rapidly oxidized, and it is for this reason (as previously noted) that in the production of sponge iron in rotary kilns a completely non-oxidizing atmosphere has been required at least in the zone where final reduction of the iron takes place, in order to prevent reoxidation of the relatively thin layer of reduced iron passing therethrough. In our method, however, in which a thick bed of charge is maintained throughout the length of the furnace, we have found that reoxidation of the reduced iron does not take place to any significant extent, notwithstanding the introduction into the furnace atmosphere of ample air to insure quite complete combustion of the heating fuel introduced through the burners at the furnace discharge end. Evidently the reduced iron is protected from reoxidation by the very thickness of the bed, even though the furnace atmosphere (particularly adjacent the discharge end) is of oxidizing character owing to the free admission of combustion air.

Continuous rotation of the furnace results in tumbling the bed of charge over and over again on itself. This tumbling action keeps it agitated sufficiently so that it is heated uniformly throughout to the desired reduction temperature, and insures reduction of substantially all of its iron content. Such agitation does not however result in significant reoxidation of the reduced iron by the combustion air.

At the optimum reduction temperature (in the range from 1750 to 1900° F.) the reduced metallic iron is "sticky" and tends to form accretions on the hot walls of the furnace. These accretions are periodically removed, without interruption of the operation of the furnace, by a water-cooled scraper bar 25 carrying at one end a laterally extending scraper blade 26. The scraper blade is of a length no greater than the diameter of the opening 22 at the discharge end of the furnace, so that it can be introduced and withdrawn through this opening. The scraper bar is mounted on a cross feed 27 which in turn is supported on a carriage 28. The carriage is movable longitudinally with respect to the furnace on ways 29. The cross feed 27 permits lateral movement of the scraper bar, once the scraper blade has entered the furnace, to bring the blade substantially into contact with the cylindrical furnace wall (i. e. to move the scraper bar and blade from the position shown in dotted lines to the position shown in full lines in Fig. 3). Then, as the furnace rotates, the carriage may be moved longitudinally to bore the accretions from the furnace wall.

Removal of the accretions in the manner just described is effected intermittently, at such intervals as may be required. To minimize the extent to which accretions form, it is advantageous for silicates or other gangue materials which are infusible at the roasting and reduction temperatures to be present in the iron-bearing feed to the roasting furnace. Such gangue somewhat reduces the tendency of the reduced sponge iron to stick to the furnace walls. Iron sulfide flotation concentrates commonly contain such gangue material, and for this reason in addition to those already given they constitute a desirable source of iron for making up the reduction furnace charge.

The type of carbonaceous material mixed with the iron-bearing material in the charge is of some importance. The carbonaceous material must serve as a rapid and effective reducing agent for carbon dioxide at the prevailing reduction temperature (1750 to 1900° F.). Hard metallurgical coke is not very satisfactory for this purpose, as it does not react with carbon dioxide very rapidly except at higher temperatures. Soft coal (bituminous or sub-bituminous) is an excellent carbonaceous material to employ. The coal advantageously is of slack fineness (if it contains lumps of appreciable size, it may advantageously be crushed to minus ¼ inch size). The volatile matter driven off from the coal at the temperature to which the bed is heated escapes from the bed and burns in the furnace atmosphere, supplementing the fuel introduced through the burner 23. Charcoal also has been found suitable for use as the carbonaceous material.

It is most desirable that a substantial excess of carbonaceous material be incorporated in the charge. The unconsumed excess is carried out with the sponge iron product and may be recovered from it by magnetic separation. Carbonaceous material recovered in the form of a soft coke in this fashion advantageously is returned for use in making up a fresh quantity of charge, and in reducing value is about twice as effective as fresh coal with a fixed carbon content of 50%.

The speed with which the reduction furnace 6 rotates is advantageously correlated with its size so that the charge traverses the furnace in a period of about three hours. In this period of time, from 90% to 95% of the iron oxide content of the charge is reduced to metallic iron. If the furnace is mounted with its longitudinal axis truly horizontal, the opening 21 at the charging end is made somewhat smaller than the opening 22 at the discharge end, so that rotation of the furnace causes the charge to move gradually to the discharge end. Alternatively, the axis of the furnace may be inclined downwardly very slightly toward the discharge end.

The reduced metallic iron product, along with the inert gangue and unconsumed carbon, is discharged from the reduction furnace into a discharge box or hood 30 from which a discharge spout 31 extends downwardly. A gas inlet pipe 32 communicates with the interior of the spout and hood, for the purpose of introducing and maintaining in the latter a non-oxidizing (or preferably reducing) protective atmosphere for preventing oxidation of the hot metallic iron product. The discharge box 30 is annular, and is advantageously provided with a cylindrical flange 33 fitting rather closely within the axial furnace opening 22. The central opening through the annular discharge box allows for introducing the scraper bar 25 and the fuel burner 23, and enables combustion air to enter the furnace.

A longitudinally extending notch 34 (best shown in Fig. 2) is formed in the discharge end wall 20 of the furnace adjacent the periphery of the central opening 22 therein. This notch provides a passageway through which the reduced sponge iron product of the furnace 6 may enter the discharge box 30. In normal operation of the furnace, when once each revolution the notch 34 reaches its lowest point, a flush of reduced product flows through it into the discharge box, and thence falls through the discharge spout 31.

The spout 31 delivers the hot sponge iron product to the interior of the cooler 7. The cooler is advantageously a cylindrical steel vessel having frusto-conical ends, mounted for rotation on a horizontal axis in a pan 35 containing a body of cooling water. The end of the cooler where the reduced iron discharge spout enters it is closed as tightly as practical by a sheet steel seal plate 36; and at its opposite end the cooler is provided with a self-sealing discharge device 37. The sponge iron delivered to the interior of the cooler is tumbled over and over as this vessel is rotated partially submerged in cooling water contained in the pan 35. Ultimately it passes therethrough and is delivered out through the discharge seal 37 at a temperature low enough so that it is not susceptible to rapid oxidation upon contact with the air. The cooled product may, if desired, be crushed and passed through a magnetic separation device for separating the sponge iron from the unconsumed excess of carbonaceous material.

It is evident that the process of the invention can be carried out in the apparatus described above in a continuous fashion. Continuous operation is highly desirable for reasons of economy. The charge of roasted concentrates (or other iron-bearing material) and coal (or other suitable carbonaceous material) is continuously delivered into one end of the reduction furnace 6, and is continuously withdrawn from the other end thereof, the rates of charge introduction and withdrawal being correlated to maintain a deep bed of charge in the reduction furnace at all times.

It has been found to be not at all difficult to control the above-described process so that the iron content of the charge is reduced to the extent of 90% to 95%. The iron product is quite finely divided, though it may contain some agglomerates which can be broken up readily by crushing. Both its grade and its physical form are eminently satisfactory for use in precipitating metallic copper from copper-bearing solutions. The simplicity of the apparatus, the use of conventional fuel-firing for heating the charge during the reduction operation, and the ease with which the process may be controlled in continuous operation, all contribute to making the process of the invention economical to carry out. By this process it is not at all difficult to produce a metallic iron precipitant for copper-bearing solutions at a cost competitive with scrap iron, and to produce it in a form that for this use is superior to most forms of scrap iron.

We claim:

1. The method of making metallic iron in a rotary furnace which comprises establishing in the furnace a deep bed of a charge comprising a loose mixture of iron oxide and solid carbonaceous material, said deep bed of charge extending throughout the interior length of the furnace and being of a depth along its center line averaging at least about one-quarter of the inside diameter of the furnace throughout said length, continuously tumbling the bed of charge, heating the charge to a temperature of from 1750° to 1900° F. by introducing fuel and sufficient combustion air for the substantially complete combustion thereof over said bed and burning such fuel in such atmosphere, substantially continuously introducing fresh charge into the heated bed at one end thereof, and substantially continuously withdrawing reduced charge containing metallic iron from the other end of said bed, the rates of charge introduction and charge withdrawal being substantially equal so that the aforesaid depth of the bed of charge in contact with the combustion gases is continuously maintained.

2. The method according to claim 1, characterized in that the charge is prepared from iron sulfide concentrates by roasting such concentrates in an oxidizing atmosphere at a temperature high enough to convert the iron sulfide to iron oxide, and mixing solid carbonaceous material with the hot roasted concentrates, the resulting charge being introduced into the rotary furnace for reduction of its iron content while still hot from the roasting operation.

3. Apparatus for making metallic iron comprising a cylindrical rotary furnace, annular end walls partially closing the furnace at each end, said end walls each having a centrally disposed opening therein of substantially smaller diameter than the inside diameter of the furnace, whereby combustion air may freely enter the furnace and a bed of charge of substantial depth may be established and maintained in the furnace during rotation thereof, and scraper means adapted to be introduced into and withdrawn from the furnace for scraping accretions from the inside surface of the furnace during rotation thereof comprising a scraper bar mounted adjacent one end of the furnace, a scraper blade of length less than the diameter of the opening at one end of the furnace projecting laterally from one end of said scraper bar, means for moving the scraper bar and blade longitudinally of the furnace through said opening, and means for moving said scraper bar laterally through said opening to bring the scraper blade substantially into contact with the interior cylindrical wall of the furnace, whereby said scraper means may be introduced into and withdrawn from the furnace through the centrally disposed opening in the end wall adjacent thereto.

4. Apparatus for making metallic iron comprising a cylindrical rotary furnace, annular end walls partially closing the furnace at each end, said end walls each having a centrally disposed opening therein of substantially smaller diameter than the inside diameter of the furnace, whereby a bed of charge of substantial depth may be established and maintained in the furnace during rotation thereof, one of said end walls being formed with a longitudinally extending notch adjacent the periphery of the central opening therein, an annular hood overlying the outer surface of said notched end wall and enclosing the notch therein, the central opening through said annular hood coinciding with the centrally disposed opening in the end wall adjacent thereto, whereby combustion air may freely enter said furnace means for introducing fuel and combustion air into the furnace through the central opening of said annular hood, and means for maintaining a non-oxidizing atmosphere in said hood, whereby hot metallic iron discharged from the furnace through said notch is received in the hood and protected from oxidation by combustion air entering the furnace.

References Cited in the file of this patent

UNITED STATES PATENTS 968,485   Ladd et al. _____ Aug. 23, 1910

(Other references on following page)

UNITED STATES PATENTS

| Number | Name | Date |
|---|---|---|
| 1,004,085 | Ross | Sept. 26, 1911 |
| 1,760,078 | Newkirk et al. | May 27, 1930 |
| 1,848,710 | Gustaffson | Mar. 8, 1932 |
| 1,917,942 | Kalling et al. | July 11, 1933 |
| 1,937,822 | Jones | Dec. 5, 1933 |
| 1,964,402 | Kalling et al. | June 26, 1934 |
| 2,146,625 | Christainsen | Feb. 7, 1939 |
| 2,267,041 | Patterson | Dec. 23, 1941 |
| 2,323,305 | Burruss, Jr. et al. | July 6, 1943 |
| 2,397,993 | Urquhart | Apr. 9, 1946 |
| 2,521,190 | Stafford et al. | Sept. 5, 1950 |